United States Patent [19]
Burton

[11] Patent Number: 6,042,254

[45] Date of Patent: Mar. 28, 2000

[54] NON-RECALIBRATABLE VEHICLE HEADLAMP AIMING DEVICE DIAL

[76] Inventor: John E. Burton, 707 W. Court St., Ludington, Mich. 49431

[21] Appl. No.: 09/191,498

[22] Filed: Nov. 13, 1998

[51] Int. Cl.[7] .................................................. B60Q 1/06
[52] U.S. Cl. .......................... 362/529; 362/284; 362/524; 362/289; 362/324
[58] Field of Search .................................... 362/524, 528, 362/529, 324, 284, 289

[56] References Cited

U.S. PATENT DOCUMENTS

| | | | |
|---|---|---|---|
| 4,703,399 | 10/1987 | Van Duyn et al. | 362/66 |
| 4,796,494 | 1/1989 | Eckenrode et al. | 81/484 |
| 4,802,067 | 1/1989 | Ryder et al. | 362/61 |
| 4,916,583 | 4/1990 | Nagasawa | 362/61 |
| 4,922,387 | 5/1990 | Ryder et al. | 362/61 |
| 4,956,706 | 9/1990 | Reiland | 362/66 |
| 4,970,629 | 11/1990 | McMahan | 362/61 |
| 5,077,642 | 12/1991 | Lisak | 362/66 |
| 5,079,685 | 1/1992 | Osborn | 362/421 |
| 5,140,503 | 8/1992 | Lisak | 362/61 |
| 5,186,532 | 2/1993 | Ryder et al. | 362/66 |
| 5,197,799 | 3/1993 | Dehaene | 362/289 X |
| 5,214,971 | 6/1993 | Burton et al. | 74/89.13 |
| 5,351,170 | 9/1994 | Nagengast et al. | 362/66 |
| 5,390,098 | 2/1995 | Reiland | 362/421 |
| 5,446,632 | 8/1995 | Childs et al. | 362/69 |
| 5,483,426 | 1/1996 | Lewis et al. | 362/66 |
| 5,539,625 | 7/1996 | Turley, Jr. et al. | 362/66 |
| 5,622,421 | 4/1997 | Turley, Jr. et al. | 362/66 |
| 5,697,161 | 12/1997 | Denley | 33/288 |
| 5,707,133 | 1/1998 | Burton | 362/66 |
| 5,707,134 | 1/1998 | Nishizawa | 362/66 |
| 5,741,059 | 4/1998 | Kusagaya | 362/524 |
| 5,746,000 | 5/1998 | Schmitt | 33/288 |
| 5,752,321 | 5/1998 | Schmitt et al. | 33/335 |
| 5,758,943 | 6/1998 | Shirai et al. | 362/66 |
| 5,778,544 | 7/1998 | Pherigo | 362/66 |
| 5,779,343 | 7/1998 | Denley | 362/66 |
| 5,951,157 | 9/1999 | Shirai et al. | 362/284 X |

Primary Examiner—Laura K. Tso
Attorney, Agent, or Firm—Brian G. Gilpin; Godfrey & Kahn, S.C.

[57] ABSTRACT

Each horizontal adjuster mechanism used in connection with low beam headlamps must be either non-readjustable after the initial adjustment or equipped with a non-recalibratable vehicle headlamp aiming device (VHAD) which is zeroed when the vehicle leaves the factory. Vehicle manufacturers must either aim the lamps and provide a non-recalibratable VHAD which is properly zeroed or aim the lamps and provide a mechanism to prevent future readjustment. A headlamp adjuster is provided with a non-recalibratable VHAD dial which zeroed after the lamp has been properly aimed and which indicates any subsequent adjustments to the aim of the headlamps.

21 Claims, 4 Drawing Sheets

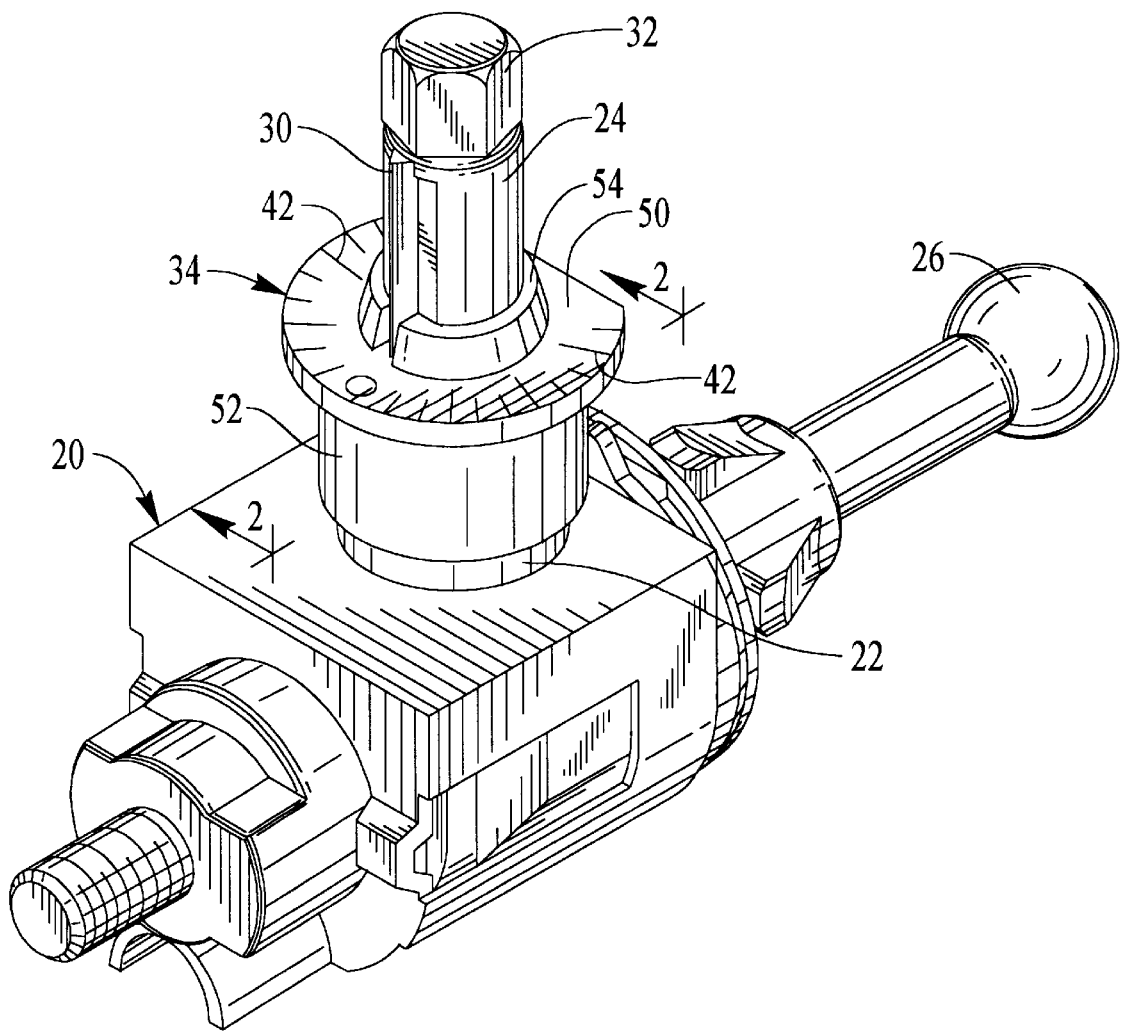
FIG_1

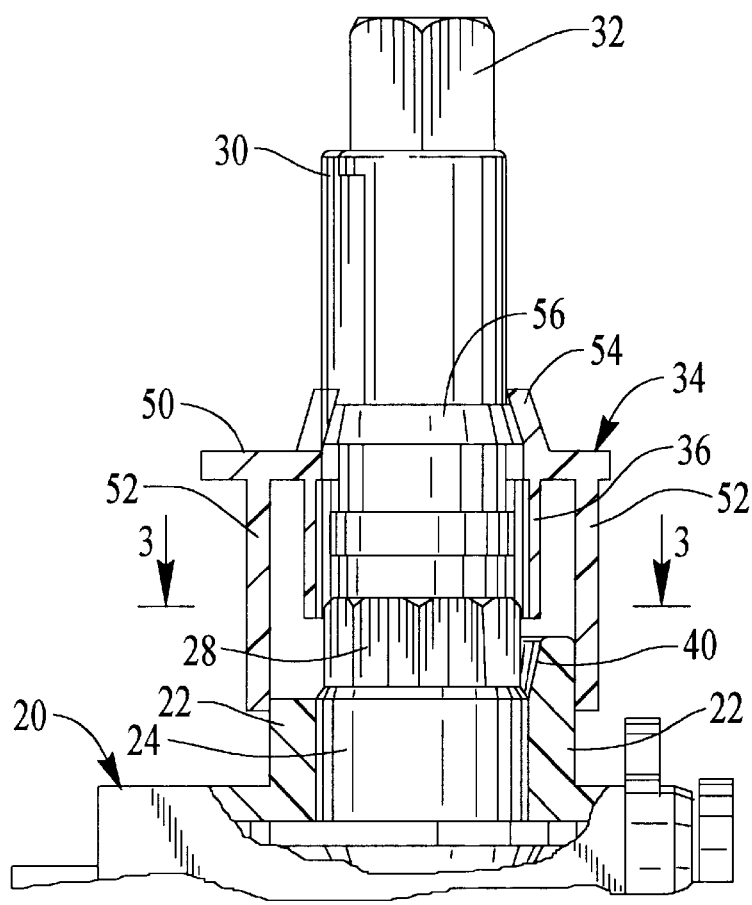
FIG_2
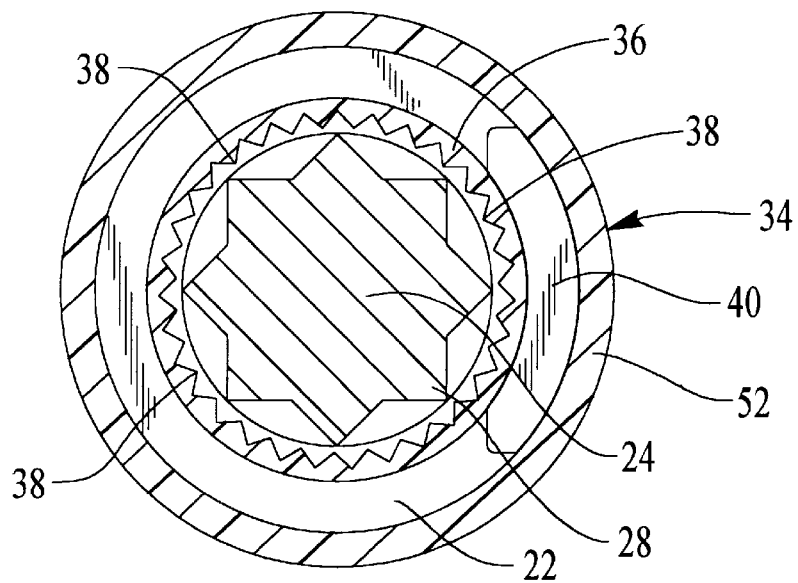
FIG_3

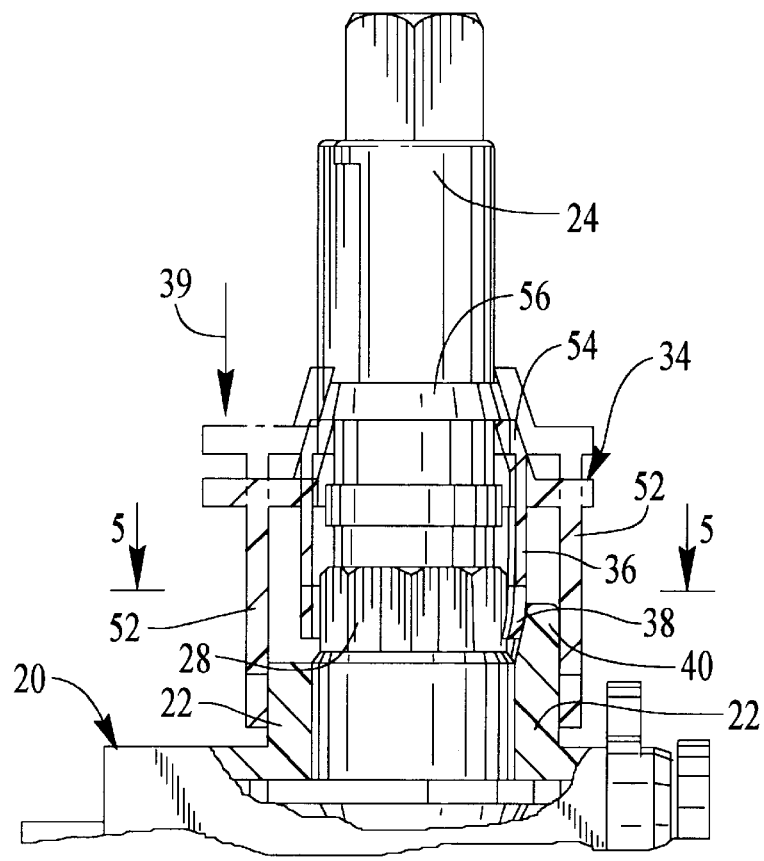
FIG_4
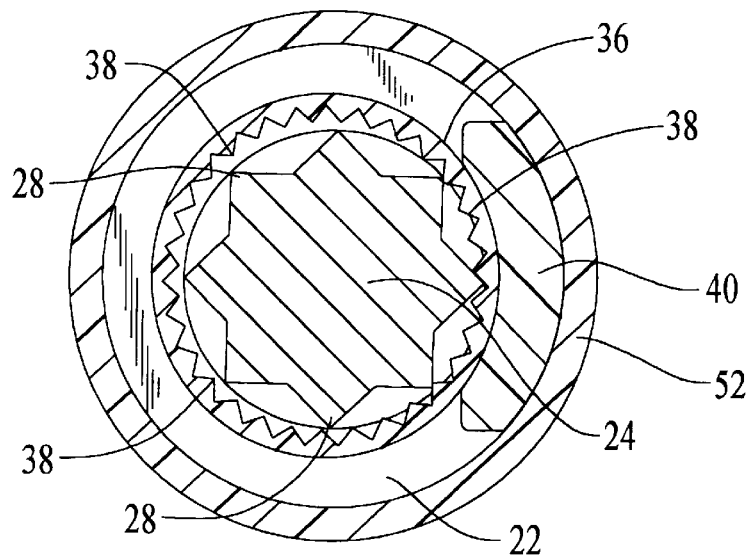
FIG_5

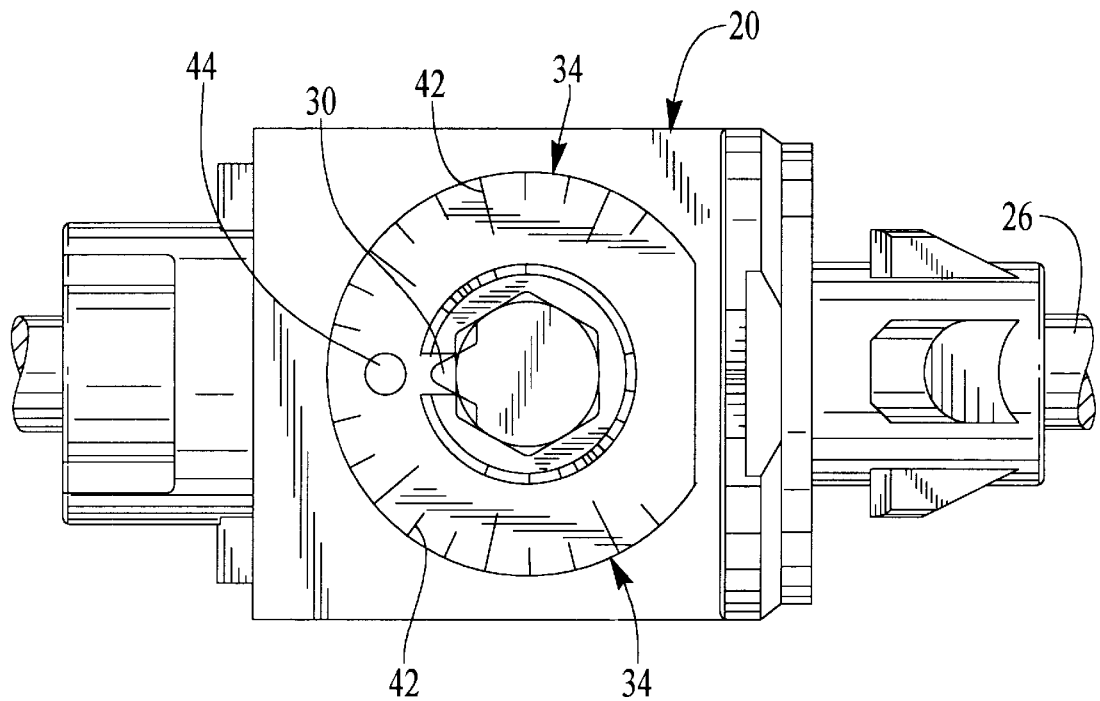
FIG_6
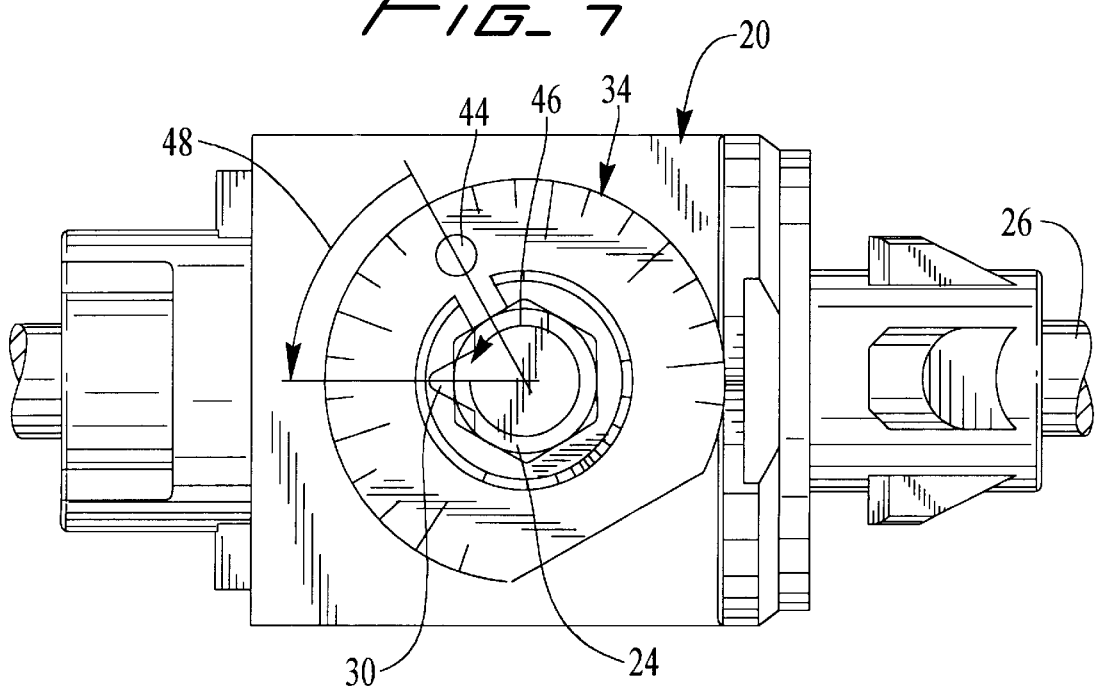
FIG_7

NON-RECALIBRATABLE VEHICLE HEADLAMP AIMING DEVICE DIAL

FIELD OF THE INVENTION

This invention relates generally to headlamp adjusters and more particularly to a headlamp adjuster which includes a vehicle headlamp aiming device dial that is non-recalibratable after initial aiming of the headlamp.

BACKGROUND OF THE INVENTION

There is a growing trend in the automobile industry to use internally adjustable reflector headlamps. Internally adjustable reflector headlamps include a reflector and bulb socket assembly enclosed within a sealed headlamp housing and lens. The orientation of the reflector within the housing is adjustable to control the direction of the light beam cast by the headlamp. Typically, the adjustable reflector is supported by three ball studs that extend from the rear of the headlamp housing and fit within sockets located in three corners of the reflector. The middle ball stud is secured directly to the headlamp housing to provide a fixed pivot point for the reflector. The other two ball studs are connected to a pair adjuster mechanisms secured to the rear of the headlamp housing. By operating the adjuster mechanisms, these two ball studs can be extended and retracted to control the horizontal and vertical orientation of the reflector. Examples of such adjusters include those disclosed in U.S. Pat. Nos. 5,707,133 and 5,214,971 to Burtoll et al., 5,483,426 to Lewis et al., 4,796,494 to Eckenrode et al., and 4,703,399 to Van Duyn et al.

Recent changes in the United States National Highway Traffic Safety Administration ("NHTSA") standards require that horizontal adjuster mechanisms used in connection with internally adjustable reflector headlamps must be either non-readjustable after the proper aim has been achieved or be equipped with a non-recalibratable vehicle headlamp aiming device ("VHAD") which is zeroed after the proper aim has been achieved. Previously, recalibration of the VHAD was allowable under the NHTSA standards. As such, vehicle manufacturers must either aim the lamps and provide a mechanism to prevent future readjustment or aim the lamps and provide a non-recalibratable VHAD which is properly zeroed. Examples of adjusters which include VHADs that can be recalibrated are disclosed in U.S. Pat. Nos. 5,622,421 and 5,539,625 to Turley, Jr. et al. and U.S. Pat. No. 5,446,632 to Childs et al. However, because of the change in NHTSA standards, the devices disclosed in the above patents can no longer be used in the manner indicated.

Accordingly, a need exists for a non-recalibratable VHAD dial which can be zeroed after initial headlamp aiming, may easily be rendered non-recalibratable after the lamp has been properly aimed at the factory, conforms to the new NHTSA standards, is cost effective to assemble, and is easily installed and operated.

SUMMARY OF THE INVENTION

Therefore, it is an object of the present invention to provide a non-recalibratable VHAD dial. It is a further object of the invention to provide a non-recalibratable VHAD dial which can be zeroed after initial headlamp aiming. It is an additional object of the invention to provide a VHAD dial that conforms to the new NHTSA standards. It is yet another object of the invention to provide a VHAD dial that is compact, cost effective to assemble, and can be efficiently and economically handled in the headlamp or vehicle assembly process. It is still a further object of the present invention to provide a VHAD dial that overcomes the disadvantages of the prior art.

As described in more detail below and shown in the accompanying drawings, the VHAD dial of the present invention includes a dial indicator which is zeroed after initial aiming and rendered non-recalibratable thereafter. When the initial aiming of the headlamp is being completed, the dial is either not attached to the adjuster or is disposed about the adjuster's input shaft in a disengaged storage position (a ramp lock may be provided to maintain the dial in the storage position). After the proper aim has been made, the dial is snapped down using a one-way snap so that any further rotation of the input shaft will also result in a pointer extending from the input shaft indicating the adjustment that has been made.

To accomplish the non-recalibratable adjustment indicating feature, the headlamp adjuster includes a shoulder portion though which the input shaft extends. The input shaft is rotated to effectuate operation of the adjuster. The input shaft includes a toothed portion and has a pointer protruding therefrom. A dial disposed about the input shaft also includes a toothed portion that is preferably a thin-walled ring gear portion with internally oriented teeth. In one alternative embodiment, the toothed portion of the dial may be comprised of a number of finger-like projections which together effectively act as a ring gear. Therefore, it should be understood that while reference is made herein to the preferred ring gear embodiment, the dial may be effectively constructed using other structure. The internally oriented teeth of the ring gear portion have a slightly larger diameter than the outside diameter of the teeth on the input shaft so that the teeth are not engaged with each other when the dial is in the disengaged position. When the dial is snapped down, a projection extending from the shoulder of the adjuster distorts the thin-walled ring gear portion so as to cause a partial engagement between the internal teeth of the thin-walled ring gear and the teeth on the input shaft. This partial engagement is on only one side of the ring gear such that there is clearance between most of the teeth of the ring gear and the teeth on the input shaft. Because of the partial engagement, when the input shaft is rotated, the teeth of the input shaft cause the ring gear to also rotate. However, there are more teeth on the ring gear than teeth on the input shaft. Thus, the ring gear and dial rotate at a slower rotational speed than the input shaft and for each degree of rotation of the input shaft, there is a lesser degree of rotation of the ring gear. This differential gives the reading of the amount of postzeroing adjustment that has been made by referring to the location of a pointer on the input shaft with respect to the zeroed position on the dial. The dial includes indicator lines to indicate how much adjustment has been made since zeroing.

The present invention can be used with any number of headlamp adjusters that have an input shaft that is rotated to effectuate the adjustment, including, but not limited to, right angle gear style adjusters, e.g., U.S. Pat. Nos. 5,214,971 and 5,707,133 to Burton et al.; cam style adjusters, e.g., U.S. Pat. No. 4,965.706 to Reilanid; coil spring style adjusters, e.g., U.S. Pat. No. 5,079,685 to Osborn; scroll style adjusters, e.g., U.S. Pat. No. 5,186,532 to Ryder et al.; and screw style adjusters, e.g., U.S. Pat. No. 5,707,134 to Nishizawa. As such, the terms "adjuster," "headlamp adjuster," and variations thereof used herein should be interpreted as being inclusive of any of the wide variety of adjustment devices possible. Similarly, the terms "input shaft," "drive shaft," "shaft," and variations thereof should be interpreted as being inclusive of any adjuster shaft that is rotated to effectuate adjustment of the aim of the reflector.

In sum, the present invention represents a significant improvement over the prior art in many ways. The VHAD dial in accordance with the present invention is non-recalibratable after initial aiming and zeroing, is efficiently and economically handled in the headlamp or vehicle assembly process, is in conformance with the new NHTSA standards, and overcomes the disadvantages of the prior art. These and other objects and advantages of the present invention will become apparent from the detailed description and accompanying drawings.

BRIEF DESCRIPTION OF THE DRAWINGS

FIG. 1 is a perspective view of a headlamp adjuster with a VHAD dial in accordance with one embodiment of the present invention;

FIG. 2 is a partial cross-sectional view of the headlamp adjuster with a VHAD dial shown in FIG. 1 taken generally along the line 2—2;

FIG. 3 is a cross-sectional view of the VHAD dial indicator shown in FIG. 2 taken generally along the line 3—3;

FIG. 4 is a cross-sectional view of the VHAD dial shown in FIG. 1 taken generally along the line 2—2 with the dial moving from a disengaged (phantom) to an engaged position as indicated by arrow 39;

FIG. 5 is a cross-sectional view of the VHAD dial indicator of FIG. 4 taken generally along the line 5—5;

FIG. 6 is a top plan view of the VHAD dial indicator of FIG. 1 with the pointer in the zeroed position; and FIG. 7 is a top plan view of the VHAD dial indicator of FIG. 2 after an adjustment has been made.

DETAILED DESCRIPTION OF THE PREFERRED EMBODIMENTS

Referring now to FIGS. 1 and 2, a headlamp adjuster 20 includes a shoulder 22 through which an input shaft 24 extends. The input shaft 24 is rotated to effectuate operation of the adjuster 20 by causing a ball stud 26 to be extended from or retracted toward the adjuster 20. While the embodiment shown in the Figures is a right angle gear style adjuster, other styles could be used. The input shaft 24 includes a toothed portion 28 and has a pointer 30 protruding therefrom. The top 32 of the input shaft 24 may have a variety of shapes such as hexagonal or TORX so that an appropriate driver can be used to cause rotation thereof. Disposed about the input shaft 24 is a dial 34 which includes a toothed portion that is preferably a thin-walled ring gear portion 36 with internally oriented teeth 38 (FIG. 3). These internally oriented teeth 38 have a slightly larger diameter than the outside diameter of the toothed portion 28 of the input shaft 24 so that the teeth 28 and 38 are not engaged with each other when the dial is in a disengaged position (FIGS. 1–3).

When the dial 34 is snapped down from the disengaged to an engaged position (FIGS. 4–7) by movement in the direction indicated by arrow 39 in FIG. 4, a projection 40 extending from the shoulder 22 of the adjuster 20 distorts the thin-walled ring gear portion 36 so as to cause a partial engagement between the internally oriented teeth 38 of the thin-walled ring gear portion 36 of the dial 34 and the toothed portion 28 of the input shaft 24. As best seen in FIGS. 4 and 5, this partial engagement is on only one side of the ring gear portion 36 such that there is clearance between most of the internally oriented teeth 38 of the ring gear portion 36 and the toothed portion 28 of the input shaft 24. Because of the partial engagement, when the input shaft 24 is rotated, the toothed portion 28 of the input shaft 24 causes the ring gear portion 36 to also rotate. However, there are more teeth on the ring gear portion 36 than teeth on the toothed portion 28 of the input shaft 24. Thus, the ring gear portion 36 and dial 34 rotate at a slower rotational speed than that of the input shaft 24 and for each degree of rotation of the input shaft 24, there is a lesser degree of rotation of the ring gear portion 36 and dial 34.

The rotation differential provides a reading of the amount of post-zeroing adjustment that has been made by referring to the location of the pointer 30 extending from the input shaft 24 with respect to the position of the dial 34. For example, in one embodiment, when the input shaft has completed one complete rotation, the dial 34 has only completed eight ninths of a rotation and the pointer 30 indicates the differential.

FIG. 6 illustrates the zeroed position of the adjuster 20 immediately after the headlamp has been aimed and the dial 34 snapped down. The dial 34 further includes indicator lines 42 which indicate how much adjustment has been made since the zero adjustment which is indicated by a zero adjustment indicator line 44. In FIG. 7, the input shaft 24 has been rotated counterclockwise as indicated by arrow 46 to reposition the ball stud 26 extending from the adjuster 20. After rotation, the input shaft 24 and the pointer 30 have rotated more than the dial 34. This differential is indicated by arrow 48 and the amount of adjustment can be easily identified by referring to the position of the pointer 30 with respect to the indicator lines 42. Indicator lines 42 are preferably established to correspond to certain degrees of adjustment of the reflector of the headlamp.

As best shown in FIGS. 1, 2, and 4, the dial 34 includes an indicator plate 50 with the thin-walled ring gear portion 36 and an outer wall 52 depending therefrom. The thin-walled ring gear portion 36 and the outer wall 52 are substantially concentric (at least until the ring gear portion 36 is deformed by the projection 40 extending from the shoulder 22). The outer wall 52 acts as a bushing to support the dial 34 around and on the shoulder 22 of the adjuster 20 and stabilizes the dial 34 to ensure smooth operation of the internal gearing relationship between the toothed portion 28 of the input shaft 24 and the ring gear portion 36 of the dial 34. Extending from the indicator plate 50 is an engagement ring 54 with interfaces with a ramp lock portion 56 of the input shaft 24 to create one-way snapping as the dial 34 is snapped downwardly as indicated by arrow 39 in FIG. 4. This reniders the dial 34 non-recalibratable after aiming and zeroing because the dial 34 cannot then be removed from the input shaft 24 and the toothed portion 28 of the input shaft 24 is partially engaged with the ring gear portion 36 of the dial 34. The engagement ring 54 also acts to support the dial 34 on the ramp lock portion 56 in a disengaged position until after aiming. Alternatively, the dial 34 may be provided as a separate part that is installed over the input shaft 24 and snapped down after the headlamp has been installed and aimed.

The dial 34 may be injection molded plastic and the indicator lines 42 and zero adjustment line 44 may be integrally molded thereon or may be painted or otherwise affixed thereto. The shoulder 22 with the projection 40 is preferably integrally formed with the adjuster 20 and the input shaft 24 is typically a zinc die-cast part but may be made from other materials.

As illustrated by the foregoing description and shown in the Figures, the present invention is more suitable as a VHAD than existing devices. The present invention overcomes the limitations and disadvantages of existinig VHADs by providing a VHAD dial which is non-recalibratable after aiming and zeroing, conforms to the new NHTSA standards, is relatively compact, and is efficiently and economically handled in the headlamp or vehicle assembly process.

Although the invention has been herein shown and described in what is perceived to be the most practical and preferred embodiments, it is to be understood that the invention is not intended to be limited to those specific embodiments. Rather, it is recognized that modifications may be made by one of skill in the art without departing from the spirit or intent of the invention. Therefore, the invention is to be taken as including all reasonable equivalents to the subject matter of the appended claims.

I claim:

1. A headlamp adjuster comprising:
   an input shaft extending from the headlamp adjuster, the input shaft having a toothed portion; and
   a dial disposed about the input shaft and moveable from a disengaged to an engaged position, the dial including a ring gear portion, wherein the toothed portion of the shaft does not engage the ring gear portion of the dial when the dial is in the disengaged position, and wherein the toothed portion of the shaft partially engages the ring gear portion of the dial when the dial is in the engaged position such that an amount of rotation of the input shaft results in a lesser amount of rotation of the dial.

2. The headlamp adjuster of claim 1 further comprising a shoulder protruding from the headlamp adjuster through which the input shaft extends the shoulder having a projection.

3. The headlamp adjuster of claim 2 wherein when the dial is moved from the disengaged position to the engaged position, the projection causes a portion of the ring gear portion to deflect to engage the toothed portion of the input shaft.

4. The headlamp adjuster of claim 3 wherein the dial further comprises an indicator plate with the ring gear portion and an outer wall depending therefrom the outer wall disposed about the shoulder when the dial is in the engaged position.

5. The headlamp adjuster of claim 4 wherein the input shaft further comprises a ramp lock portion and wherein the dial further comprises an engagement ring the engagement ring interfacing with the ramp lock portion when the dial is in the engaged position to retain the dial in the engaged position.

6. The headlamp adjuster of claim 4 wherein the indicator plate has a plurality of indicator lines thereon.

7. The headlamp adjuster of claim 6 wherein at least one of the plurality of indicator lines is a zero adjustment line.

8. An apparatus for use in connection with a headlamp adjuster having an input shaft with a toothed portion, the apparatus comprising:
   a dial positionable about the input shaft in an engaged position, the dial including a ring gear portion, wherein the toothed portion of the shaft partially engages the ring gear portion of the dial when the dial is in the engaged position such that an amount of rotation of the input shaft results in a lesser amount of rotation of the dial.

9. The apparatus of claim 8 further comprising a shoulder protruding from the headlamp adjuster through which the input shaft extends, the shoulder having a projection.

10. The apparatus of claim 9 wherein the dial is disposed about the input shaft and is moveable from a disengaged position to the engaged position and wherein when the dial is moved from the disengaged position to the engaged position, the projection causes the ring gear portion to deflect to partially engage the toothed portion of the input shaft.

11. The apparatus of claim 10 wherein the dial furtlher comprises an indicator plate with the ring gear portion and an outer wall depending therefrom the outer wall disposed about the shoulder when the dial is in the engaged position.

12. The apparatus of claim 11 wherein the input shaft further includes a ramp lock portion and wherein the dial further includes an engagement ring the engagement ring interfacing with the ramp lock portion when the dial is in the engaged position to retain the dial in the engaged position.

13. The apparatus of claim 11 wherein the indicator plate has a plurality of indicator lines thereon.

14. The apparatus of claim 13 wherein at least one of the plurality of indicator lines is a zero adjustment line.

15. A vehicle headlamp aiming device for use in connection with a headlamp adjuster having an input shaft with a first toothed portion the vehicle headlamiip aiming device comprising:
   a dial positionable in an engaged position about the input shaft, the dial including a second toothed portion, and wherein the first toothed portion of the shaft partially engages the second toothed portion of the dial when the dial is in the engaged portion such that an amount of rotation of the input shaft results in a lesser amount of rotation of the dial.

16. The vehicle headlamp aiming device of claim 15 wherein the dial is positionable in a disengaged position and is moveable from the disengaged position to the engaged position, wherein the first toothed portion of the shaft does not engage the second toothed portion of the dial when the dial is in the disengaged position.

17. The vehicle headlamp aiming device of claim 16 wherein when the dial is moved from the disengaged position to the engaged position, a projection extending from a shoulder on the headlamp adjuster causes a portion of the second toothed portion of the dial to deflect to engage the first toothed portion of the input shaft.

18. The vehicle headlamp aiming device of claim 17 further comprising an indicator plate with the second toothed portion and an outer wall depending therefrom, the outer wall disposed about the shoulder when the dial is in the engaged position.

19. The vehicle headlamp aiming device of claim 18 further comprising an engagement ring, the engagement ring interfacing with a ramp lock portion of the input shaft when the dial is in the engaged position to retain the dial in the engaged position.

20. The vehicle headlamp aiming device of claim 18 wherein the indicator plate has a plurality of indicator lines thereon.

21. The vehicle headlamp aiming device of claim 20 wherein at least one of the plurality of indicator lines is a zero adjustment line.

* * * * *